United States Patent [19]

Bernardy

[11] Patent Number: 5,361,570
[45] Date of Patent: Nov. 8, 1994

[54] COMPOUND PRUNING AND SHREDDING BLADE

[76] Inventor: Eckhard Bernardy, 11017 NE. 124 Ave., Vancouver, Wash. 98682

[21] Appl. No.: 919,713

[22] Filed: Jul. 24, 1992

[51] Int. Cl.$^5$ ............................................. A01D 34/82
[52] U.S. Cl. ........................................ 56/255; 56/295; 56/DIG. 17; 56/DIG. 20; 30/347
[58] Field of Search ............... 56/255, 295, 17.5, 15.2, 56/15.9, 15.5, DIG. 20, DIG. 17; 30/347, 357, 346.57

[56] References Cited

U.S. PATENT DOCUMENTS

| | | |
|---|---|---|
| 2,976,666 | 3/1961 | Machovec . |
| 3,059,400 | 10/1962 | Plummer . |
| 3,078,573 | 2/1963 | Kern . |
| 3,336,737 | 8/1967 | Belfiore . |
| 3,338,039 | 8/1967 | Nightingale . |
| 3,346,955 | 10/1967 | Beneke . |
| 3,482,380 | 12/1969 | Stair . |
| 3,781,991 | 1/1974 | Stretton ............................ 30/276 |
| 3,975,891 | 8/1976 | Gunther ............................ 56/295 |
| 4,062,171 | 12/1977 | Rose ................................... 56/295 |
| 4,083,166 | 4/1978 | Haas ................................ 56/255 X |
| 4,250,622 | 2/1981 | Houle ............................... 30/347 |
| 4,300,336 | 11/1981 | Miyata .............................. 56/295 |
| 4,302,878 | 12/1981 | Bonforte ............................ 30/347 |
| 4,310,999 | 1/1982 | Onoue .............................. 56/295 |
| 4,362,007 | 12/1982 | Kennedy ............................ 56/295 |
| 4,368,610 | 1/1983 | Aono ................................. 56/295 |
| 4,527,382 | 7/1985 | Aono ................................. 56/295 |
| 4,769,977 | 9/1988 | Milbourn ......................... 56/255 X |
| 4,890,448 | 1/1990 | Doi .................................... 56/255 |
| 4,893,457 | 1/1990 | Castain ............................. 56/295 |
| 4,938,012 | 7/1990 | Klima ............................... 56/295 |
| 4,946,488 | 8/1990 | Davison ......................... 56/255 X |
| 5,056,605 | 10/1991 | Bond et al. .................... 56/255 X |
| 5,167,109 | 12/1992 | Meinerding ............... 56/DIG. 20 X |
| 5,197,268 | 3/1993 | Barrera ............................. 56/255 |

FOREIGN PATENT DOCUMENTS 2144314  3/1985  United Kingdom ................ 56/255

Primary Examiner—Terry Lee Melius

[57] ABSTRACT

A rotary brush and weed clearing blade for powered implements with a serrated disk and serrated axial elements projecting from one or both disk surfaces for multidirectional cutting and in-situ shredding. The axial cutting elements can be integral or separately mounted and provide efficient operation in blade work directions not possible with conventional blades. Recessed location of projecting cutting elements allows cutting depth calibration for powertrain protection. Staggered axial elements mounting results in a debris-clearing feature through centrifugal forces. Axially projecting cutting elements create a locating guide effect unique to the invention. Use of conventionally serrated cutting elements in new and unique applications transfers their inherent smoothness and yet aggressive efficiency, into this fully multidirectional blade.

Design simplicity offers efficient manufacturing.

6 Claims, 1 Drawing Sheet

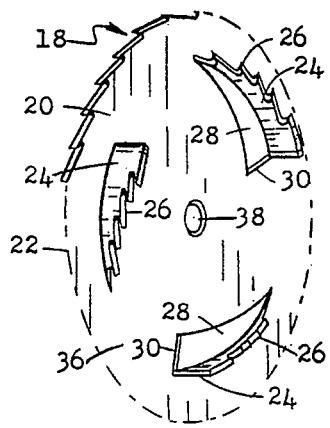
FIG. 1
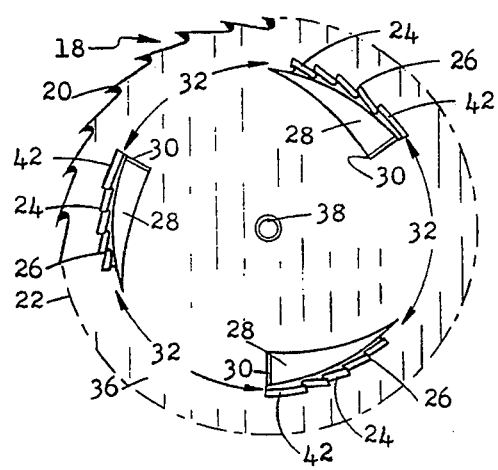
FIG. 2
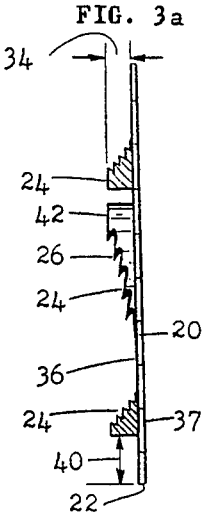
FIG. 3a
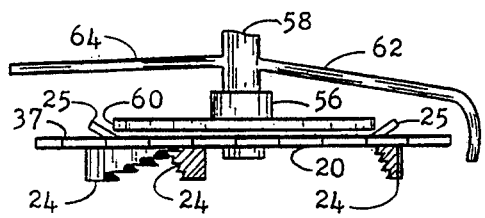
FIG. 3b
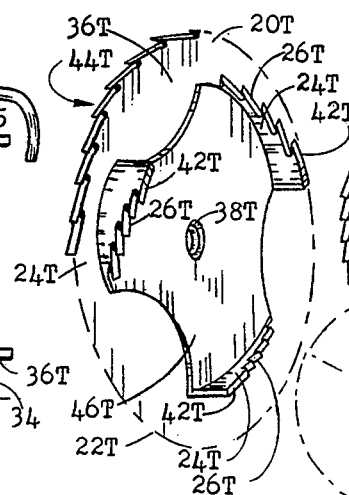
FIG. 4
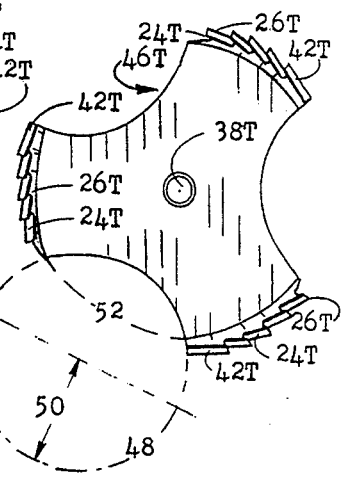
FIG. 5
FIG. 6
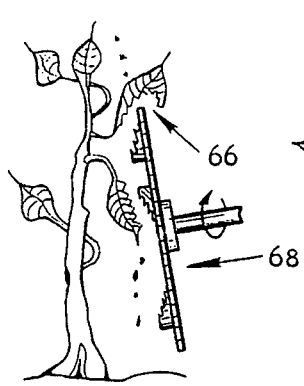
FIG. 7
DIAGONAL MODE
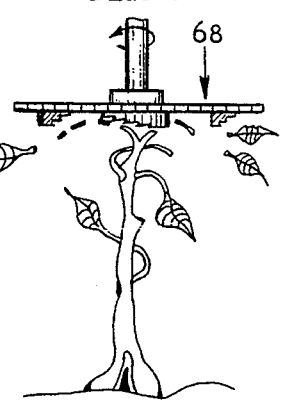
FIG. 8
AXIAL MODE
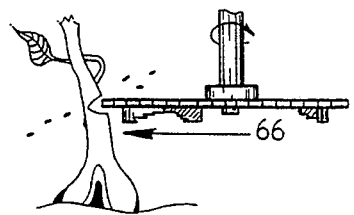
FIG. 9
RADIAL MODE

COMPOUND PRUNING AND SHREDDING BLADE

BACKGROUND

1. Field of the Invention

This invention relates to brush and weed cutting blades, particularly such blades as are attached to motorized brush and weed cutting implements.

2. Description of Prior Art

Motorized pruning or brush cutting machines using a variety of metal or elastomer cuttting blade attachments are well known and many different blade designs have been offered in a relatively crowded field. With varying degrees of success objectives such as safety, efficiency, longevity, self-sharpening, economy of manufacture and the like have been achieved. However, certain objectives have not been met, but are the focal point of this application.

It can be stated, that existing blade designs fall into two broad categories. One of these is essentially based on bar-type structures, while the other uses the disk as a basic design element.

U.S. Pat. No. 4,938,012 to Klima (1987), illustrates the bar-type, suitable to some degree for both weeds and grasses as well as for light brush. Unfortunately, the flora has to be of fairly light ligneous substance with insignificant cross-sections, or power requirements to sustain essentially flail-like cutting actions (just two per revolution) rise dramatically as toughness and resistance of objects encountered increase. Moreover, the ponderously intermittend cutting action itself imparts shocks to both equipment and operator. The pulsations become exaggerated through even slight imbalances due to wear or damage to the blade. Ultimately, violent vibrations may render the tool inoperable, until balance is again restored.

A somewhat more effective blade design is illustrated in U.S. Pat. No. 4,302,878 to Bonforte (1979). An additional cutting element has been added to engage the targeted flora with a triangular shape. Still, the cutting action is intermittend, the individual blades are too widely spaced even at 5,000 to 6,000 RPM, not atypical of modem equipment, to effect very smooth cutting. Pulsating impacts are again noticeable during the cutting of fairly substantial ligneous plant members and successful use must be restricted mostly to light flora or soft, sap-laden stalks and the like.

Nonetheless, the triangular design represents a commonly used blade despite some shortcomings, although usually in an all-steel version as illustrated by U.S. Pat. No. 3,781,991 to Stratton et al (1971).

Additional reference is made to U.S. Pat. No. 4,250,622 to Houle (1979), in order to show a disk-type blade featuring multiple cutting elements, assuming for the moment the reinforced elastomer material of this fairly complex design is up to the task of successfully engaging heavy ligneous stalks including tree saplings and stout branching, a task not envisioned by the inventor, who evidently favored the novelty of his original elastomer safety design over more rugged all-metal versions.

All-steel construction is evident en U.S. Pat. No. 4,527,382 to Aono (1983) on variously shaped disk derivative designs with multiple cutting elements peripherally dispersed. These designs with their undulating serrated outlines overcome some of the shortcomings of excessive pulsation and vibration and also allow fairly substantial plant members to be effectively engaged.

The Aono designs, as well as many others, are related to if not derived directly from the common peripherally serrated disk blade, in practically universal use since very early days of the Industrial Revolution. Even today, the common round saw blade is still unsurpassed for simplicity of construction, smoothness of operation and sheer cutting efficiency. Its operational smoothness stems primarily from the extremely rapid successive engagement of a multiplicity of cutting elements. Similarly, its high cutting efficiency results from a very aggressive application of many individual cutting elements.

Adaptation of disk-type blades to brush and weed cutting, however, quickly reveales an Achilles heel, such blades do not function well in an axial mode.

The axial mode of operation is defined within this application (and conforming to the usual mounting position of such blades on brush/weed cutting implements) as having a work direction which is parallel to or extensive of the axis of blade rotation. It is therefore at 90 degrees or right angle to the flat forward blade surface (or downward, as the case may be). It is obvious, that this work direction is contra-indicated, even non-sensical for any ordinary disk saw blade with an intended cutting direction radiating always from the disk center and along paths parallel to the surface of the blade.

This latter, naturally correct operational mode for any circular saw blade in common use, will be referred to in this application as the radial mode.

Using a normally constituted peripherally serrated disk blade in work directions other than the intended radial mode on a brush or weed cutting machine, will result in an unsatisfactory outcome due to the blocking action incurred by the surface of the disk. However, since the outstanding qualities of the conventional cutting disk are unsurpassed smoothness and cutting efficiency - if used as originally intended - these qualities should ideally not be curtailed or even deleted, as was done with so many previous designs. Instead, if possible, these original and time-tested attributes should be adapted in a new and novel design allowing their transfer into a multi-directional blade. The specific tailoring of new qualities for a disk-type blade, widely useful for all types of work, is generally dictated by field conditions. The task, for example, to reduce a large, well established tangle of Rubus Villasus (blackberry) is not well dealt with using a conventional disk blade. Invariably, the many vines will be arched and entwined in random juxtaposition. However, any blade able to cut in the radial mode only, is here of little value. The seemingly stubborn vines, although already cut in many places, will remain largely in place, vine clinging to vine in a thorny and altogether still impenetrable thicket. The necessary subsequent handling involves heavy-gloved, unpleasant and time-consuming labor. Also, an ultimate disposal problem for the cut vegetation still remains.

Somewhat better results are obtained with a multiple blade cutter such as a triangular blade or other blades with additional cutting elements. Still, the cutting action is again largely restricted to radial cuts, parallel to the large flats of the blade, or the radial mode. This restriction requires many blade angle shifts to reach new material. Further, unless relatively light ligneous substances encountered facilitate shredding, final results with this type of blade are only marginally superior to the pure disk design. It should be noted, that very substantial branching, saplings etc. cannot be efficiently cut with this type of blade without extraordinary power inputs.

The need, therefore, for a universal type of blade, fully multidirectional and with equal suitability for relatively heavy ligneous members such as branching etc., as well as light plant matter, is apparent. Specifically, a blade is needed which has combined cutting capability in the above defined traditional radial mode, as well as in the axial mode. It should further be able to cut at all other angles to the blade, where both of these modes of operation come simultaneously into action. To make the blade fully multidirectional, an effective rearward axial mode opposite to the axial mode with an added angular or rearward axial diagonal mode to complement the forward diagonal mode capability, is needed. The term diagonal simply denotes angles to either surface of a blade less than 90 degrees. Diagonal modes can be viewed as transitional modes of operation, as for example, during a change over from a purely axial mode to a radial mode. Diagonal mode capability allows uninterrupted cutting and or shredding, as material is encountered at a variety of angles to the blade, without deliberate blade angle adjustment by the operator. A fully multidirectional blade embodying further the unsurpassed smoothness and cutting efficiency inherent in traditionally serrated cutting elements, has further obvious advantages. A pronounced shredding capability, allowing in-situ shredding, has potential long-term (albeit localized) environmental implications, in addition to the immediate practical benefits of reduced labor input.

Some prior art, notably U.S. Pat. No. 3,078,573 to Kern (1962) does have very limited axial mode capability. The limitation, however, stems from the fact that the cutting elements are really a form of bar-type projection raised from a disk-like structure. This hybrid blade has virtually no radial cutting capability to deal with relatively substantial plant members. Thus one feature has merely been traded for another, as also all other disadvantages of bar-type designs are still present.

It may appear obvious and practical to simply use different blades for different tasks. A bar-type blade can be used for light brush and weeds and a disk-blade may be applied to saplings and more substantial branching etc. Unfortunately, nature herself strongly discourages such a tactic by flourishing in often rich abundance and diversity and on all types of terrain, in close proximity, many different species of plants with their distinct physical characteristics. Repeated blade changes under often arduous field conditions will soon become onerous to the operator and not contribute to work efficiency. However, an appropriately designed fully multidirectional blade allowing unimpeded cutting and shredding of both very light as well as relatively heavy plant substances using a combination of axial, radial or diagonal mode engagements will provide good service. This kind of adaptability is especially welcome when the available alternatives to brush clearing are considered which include the use of heavy equipment, defoilants, fire and even plant chewing domesticated animals. Usually, however, much laborious hands-on action is required, even when assisted with motorized tools. Further, each of the steps is a certain user of fossil fuel energy (even animals need to be transported, usually, and don't do the job completely in any case), therefore a meaningful reduction of energy consumption through in-situ shredding and subsequent mulching has positive environmental implications.

Nonetheless, prior art, as reflected by world markets and by U.S. Patents, reveals no blade or blade assembly having the desired attributes. In particular, all brush and weed cutting blades heretofore known, suffer from one or more of the following disadvantages:

a) Their designs, if based on the bar-type cutter, are severely limited in cutting larger ligneous plant members without application of extraordinary power.

b) Disk-type designs entail severe limitations with respect to in-situ shredding.

c) Neither bar nor disk-type designs possess adequate capability when employed in the herein defined axial mode.

d) Bar-type cutters typically suffer from a lack of smoothness during heavy cutting action due to the severely limited number of individual cutting engagements per revolution.

e) Bar-type cutters dull easily due to the restricted number of available cutting edges.

f) Use of various types of elastomer materials in cutter construction renders these essentially unsuitable for application on heavy ligneous plant members such as saplings or substantial branching.

g) Bar-type cutters are easily imbalanced due to uneven wear or damage and then suffer from vibration which may render them inoperable until balance is again restored.

h) Disk derivative designs with substantial deviation from true circular shapes are net generally compatible with standard shop reclaiming machines.

i) Cutters of all types typically lack any feature to positively limit the depth of cutting engagement, thereby not protecting the powertrain from potential overload conditions encountered particularly during the felling of saplings etc. when binding of the engaged blade frequently occurs.

j) Some designs are unduly complex, requiring highly specialized tooling and cannot be initially economically produced.

k) No design found in prior art has a special feature which assists the blade to remain engaged during some types of operations, thereby facilitating the in-situ shredding process. This unique feature shall be subsequently named a Locating Guide Feature.

OBJECTS AND ADVANTAGES

Conversely, a number of objectives and advantages of the present invention are:

a) To provide a multi-use design suitable for all types of flora, with efficient power use.

b) To put forward a design with outstanding in-situ shredding capability.

c) To present outstanding performance in the above defined axial mode.

d) To present additional performance capability in the above defined rearward mode as well as in diagonal modes both forward and rearward.

e) To propose a unique compound blade design which successfully transfers the unsurpassed smoothness and cutting efficiency of traditionally serrated cutting elements into multi-directional modes of deployment.

f) To illustrate a blade relatively insensitive to minor wear or damages, thereby retaining acceptable balance throughout lengthy service intervals.

g) To employ the use of high quality tempered steel alloy to achieve exceptional ruggedness and longevity, while not excluding use of additionally suitable materials such as elastomer for less demanding applications.

h) To allow standard shop reclaiming methods and equipment to be used on the device.

i) To incorporate a positive cutting depth control into both the radial and axial modes; to allow judicious matching of the available powertrain to protect from potential overload conditions.

j) To simplify a compound blade design into a Unibody structure, thus encouraging economical production and contributing to reliability and light weight.

k) To produce a design, which as a natural consequence of its novelty, uniquely provides a very useful Locating Guide Feature during certain operational conditions. This wholly unanticipated result allows continuous engagement of the blade to various plant members while progressive cutting and shredding takes place, without requiring repeated repositioning from the operator.

l) To provide a blade which is inherently self-cleaning during operation to avoid clogging of angularly projecting cutting members.

m) To solve a problem not previously clearly recognized; that previous blades needed to be specifically angled toward the targeted flora to be cut due to their very limited multi-directional capability. In contrast, the present design needs to be merely thrust into general contact to engage itself effectively with most materials.

n) To combine in previously unsuggested permutation several previously known elements into a novel new structure with new characteristics and utility.

o) To achieve results through a unique combination of separate elements not individually obtainable, with a final, synergistic outcome.

p) To solve a long standing and long felt but previously unaddressed need to combine effective cutting and shredding functions in one simple, single instrument.

q) To advance a field with crowded art a few small but significant steps.

r) To contribute to energy and labor savings while making soil improvements possible through in situ shredding and cutting and subsequent mulching.

s) To further allow economical conversion of existing disk-type blades into multi-directional compound blades by the adaptation of a separate forward cutting blade attachment to form Tandem Blades.

Still further objects and advantages will become apparent from a detailed consideration of the ensuing description and drawings.

BRIEF DESCRIPTION OF THE DRAWINGS

A fuller understanding of the present invention will be gained from the detailed description given herein below and from the accompanying drawings which are by way of illustration only and are not limitative of all variations possible within the scope and spirit of the present invention and wherein, FIG. 1 is a frontal perspective view of a Unibody Blade embodiment of the present invention, illustrating the Axial Cutting Elements.

FIG. 2 is a full frontal view of the Unibody Blade, showing the Axial Cutting Elements in their relative positions.

FIG. 3a is a side view of the Unibody Blade, showing the Axial Cutting Elements protruding from the forward facing surface of the Radial Cutting Disk.

FIG. 3b is a side view of the Unibody Blade with Axial Forward Cutting and Rearward Cutting Elements, further showing the blade mounted on an implement arm and head.

FIG. 4 is a frontal perspective view of an alternative Tandem Blade design, wherein the Axial Cutting Elements are provided by a separately mountable blade.

FIG. 5 is a full frontal view of the separately mountable Axial Cutting Elements Blade.

FIG. 6 is a side view of the Axial Cutting Elements Blade as mounted on a Radial Cutting Disk.

FIG. 7 is an operational side view of either the Unibody or Tandem Blade utilizing the Diagonal Mode.

FIG. 8 is an operational side view of either the Unibody or Tandem Blade utilizing the Locating Guide Feature.

FIG. 9 is an operational side view of either the Unibody or Tandem Blade engaged in the Radial Mode.

REFERENCE NUMERALS IN DRAWINGS

To allow for convenient reference, the below summary of numerical designations used within this application is provided. Numbers with the letter suffix 'T' specifically apply to the Tandem Blade embodiment.

18 unibody blade
20 disk portion
20T disk
22 disk portion periphery
22T disk periphery
24 axial cutting element
24T axial cutting element
25 rearward cutting element
26 serrations (of 24)
26T serrations (of 24T)
28 void
30 rear of void (28)
32 open spacing (related to 24, 24T, 25)
34 axial cutting depth, maximum
36 disk portion forward surface
36T disk surface forward surface
37 disk portion rearward surface
38 arbor hole
38T arbor hole
40 radial cutting depth, maximum
42 rear margin (of 24)
42T rear margin (of 24T)
44T tandem blade
46T blade, axial cutting
48 circle, imaginary
50 radius (of 48)
52 circle, segment
56 mounting head
58 drive shaft tubing
60 protective plate
62 shield
64 torque reaction bar
66 arrow, radial mode illustration
68 arrow, axial mode illustration

DESCRIPTION OF THE INVENTION—FIGS. 1–6

The static physical structure of the present invention will now be described in detail with reference to the drawings.

Unibody construction of the compound blade 18 is illustrated in FIG. 1 (frontal perspective) and in FIG. 2 (frontal view) and also in FIG. 3a (side view).

Compound blade 18 has a circumferentially and conventionally serrated disk portion 20. Many variations in saw tooth design are possible, but generally, the more teeth on the blade, the smoother the cut. However, this must be balanced with the cost of the blade and with the force required to feed the blade through the work, as both factors rise with the number of teeth employed. More subtle variations include tooth geometry and hook angles (the angle of attack to the work). Extensive testing has revealed that approximately 24 to 30 teeth per blade with an aggressive 20 degree hook provides good performance.

One side of the disk portion 20, termed 'forward' (which may be facing downward or in other directions, but is the open and exposed side of the blade as mounted on cutting implements), at 36, features a number of angularly, prominently projecting cutting elements 24, referred to as Axial Cutting Elements. These elements are arranged intermittently in a circular pattern. Their location is considerably inset from the periphery 22 of disk portion 20.

The Axial Cutting Elements are ramp shaped and serrated in saw tooth fashion. The general considerations regarding saw tooth design above, apply also here. However due to lower cutting speeds dictated by an inset location, relative saw tooth size is reduced (down to as little as 50% of peripheral tooth size). The amount of set (staggering of teeth from side to side) is increased substantially to increase the shredding function (from about 1 degree to approximately 3 degrees).

An alternative design shown at FIG. 3b (side view) embodies supplemental Rearward Axial Cutting Elements 25, also in circular pattern, but in slightly more inset position relative to the disk portion periphery 22. These elements are of significantly reduced dimensions and are angled at about 45 degrees toward the rearward surface 37 of the disk portion 20.

Cutting directions of all cutting elements are, of course, identical and appropriate for the intended equipment. The precise number of any Axial Cutting Elements can be varied and adapted to specific power availability (and job conditions) and can therefore consist of fewer or more than the three elements illustrated. However, extensive field testing and certain manufacturing considerations support the use of three elements as a good choice. One method to create the projecting cutting elements on either blade side, is to use an extrusion process, whereby original disk material is appropriately displaced to form the required elements. Use of three elements on either side of the disk, allows symmetrical staggering from side to side with an inherently natural balance and good performance. Some consequential weakening of the disk structure due to the creation of substantial voids 28 (FIGS. 1, 2) is acceptable, but should be minimized.

The straight line 30 created by the extruded Axial Cutting Elements 24 at the rearmost location of voids 28 can optionally be provided with a sharpened edge to facilitate cutting. Voids created by the material displacements forming the somewhat diminished Rearward Cutting Elements 25 are too small to be a significant consideration in this respect. Also, a welding process without voids is reflected on FIG. 3b. Employment of welding to affix both the Forward and Rearward Cutting Elements eliminates the voids with related disk weakening, but may add to the weight of the structure. Use of welding, however, entails special problems related to the uniformity of the molecular structure of the blade material which must be heat treated to achieve desirable final qualities, with very strict quality control necessary to avoid potential problems.

Regardless of specific manufacturing details selected, large gapping or open spacing is provided between each two cutting elements, ends and beginnings, as shown by FIG. 2 at locations 32. An exception to this would entail substitution of a serrated undulating ring structure (not illustrated) in lieu of the above described Forward or Rearward Cutting Elements. Yet, even this modification provides low sections of projecting elements alternating with high ones, thereby again fulfilling the functions of open spacing.

A centralized non-keywayed arbor hole 38 or 38T is shown on FIGS. 1, 2, 4 and 5, serving all versions, as the inertial forces encountered are usually within quite acceptable limits for friction fitting of blades.

FIG. 3a shows at 34 the maximum distance or projection hight reached by the Axial Cutting Elements 24, based on surface 36 of disk portion 20. This is the maximum cutting depth in this direction.

FIG. 3a further shows at 40 the distance between the serrated periphery 22 of disk portion 20 and the projection of Axial Cutting Element 24, indicating the maximum lateral cutting depth.

FIG. 3a additionally illustrates in full side view one of the Axial Cutting Elements 24, showing the basic ramp structure's triangular design. Notable is a detail of the serration 26, which is not carried completely to the highest part of ramp 42, but instead leaves this area unserrated.

FIG. 3b is a side view illustrating a mounted Unibody blade version displaying Rearward Axial Cutting Elements 25 projecting from the rearward surface 37 of disk portion 20 in addition to the opposing and more prominent Axial Cutting Elements 24. The mounting head 56 of a motorized implement is shown, providing details of the recessed location of a protective plate 60, mounted rigidly with the mounting head and drive shaft tubing 58. Shielding 62 is shown attached near the mounting head and a torque reaction bar 64 is incorporated near the mounting head, conforming to standard practice.

FIGS. 4, 5 and 6 show an embodiment of the present invention, where laterally extended Radial Cutting Elements are part of a separate peripherally serrated disk 20T and where Axial Cutting Elements are provided by a separate blade 46T featuring such elements at 24T. Both parts are combined via conventional mounting into a single assembly, as shown by FIG. 4, and referred to as Tandem Blade 44T. All elements of the Tandem Blade 44T corresponding to similar elements of the Unibody Blade 18 bear corresponding reference numerals with the letter suffix 'T'.

FIG. 4 shows in frontal perspective view both the serrated disk blade 20T and the correctly mounted Axial Cutting Elements blade 46T, comprising Tandem Blade 44T. Further illustrated are the typical Axial Cutting Elements 24T, having serrated cutting edges 26T, a non-serrated rear margin 42T and as before, the number of elements is again three (but can be more or fewer).

FIG. 5 provides explicit detail of the design and structure of the Axial Cutting Element blade 46T, in frontal view. Circle 48 denotes along with circle 52 a segmented area of excess material to be removed within the intersecting arcs. Circle 48 is formed with radius 50, whereas 52 is really segmental of the partly imaginary periphery of the separate Axial Cutting Elements blade. Removal of excess material lightens without unduly weakening the blade.

Further shown on FIG. 5 are the rearward margins 42T of the Axial Cutting Elements 24T which are again left unserrated. Exact dimensions of these unserrated margins are not crucial, but should be approximately 15%–20% of the total length of each individual structure. Their function is to buttress this initial contact area and to simultaneously provide a reserve of material for repeated reclaiming. Reclaiming will over the life of the tool gradually reduce the size of the unserrated margins.

FIG. 6 shows in detailed side view the relative mounting position of the separate Axial. Cutting Elements Blade 46T and the serrated disk blade 20T. Also illustrated is the distance 40T between the periphery 22T of the separate disk 20T and the projections of the Forward Cutting Elements 24T of blade 46T. Additionally shown at 34T is the maximum projection of the Axial Cutting Elements 24T with respect to the surface of the separate disk 36T. A single Axial Cutting Element 24T is further illustrated in full side view, again featuring the serrated cutting edge 26T and the non-serrated posterior margin 42T.

OPERATION OF THE INVENTION

Mounting—FIGS. 1–3b, 4–6

The Unibody Blade of FIGS. 1–3b and the Tandem Blade of FIGS. 4–6, as well as other possible variations of the present invention, are attached conventionally to the end of the driven arbor by nut and washer. Relatively light hand-held units do not require keyed mounting, as was established by extensive field testing. A small amount of creep is acceptable, even providing a safety feature in the event an immobile, hard object is struck. Threading the arbor and fastening nut in the opposite direction from the blade cutting direction will further serve to assure the reliability of the attachment as during blade creep wether from normal operation or sudden impact, the frictional contact serves to tighten the nut.

The Tandem Blade is an assembly. The radial cutting disk FIG. 4, designation 20T, must be positioned first on the arbor, with the Axial Cutting Blade 46T mounted next, to properly complete the assembly. The completed Tandem Blade then offers features of multidirectional cutting and shredding with characteristics unique to the invention and not obtainable with either an ordinary disk blade alone or a purely axial cutting blade.

An economically useful advantage of the separately mountable Forward Cutting Blade is its ready ability to convert any existing ordinary disk blade to a multididirectional Tandem Blade. On most implements there is adequate arbor length to allow piggy-back mounting, even if at times a thinner washer will need to be used.

The Unibody Blade, with its inherent simplicity, already combines all multidirectional functions in one single unit.

Radial Mode—FIGS. 1–7, 9

Both conventional disk saw blade portion 20 and disk 20T cut in conventional fashion, that is in work directions predominantly parallel to the blade surfaces 36 or 36T and radiant in all directions from the center. The standard disk blade was selected for this purpose primarily for reasons of unsurpassed cutting efficiency and smoothness. In normal Radial Mode, this blade provides the conventional feature of the present invention; FIG. 9, arrow '66'.

FIG. 9 further illustrates the Cutting Depth Limiting Feature incorporated into the compound blade designs, near the point of arrow '66'. Particularly leaning saplings or branches pose an ever-present hazard of wedging or binding the blade into the cut. However, both the Forward and the Rearward Cutting Elements can be judiciously calibrated in their relative positions to limit the Radial Mode cutting depth. This also serves to protect the powertrain against sudden overload conditions due to work fed too rapidly. In detail, this is accomplished through variations in the distance 40 of FIGS. 3a and 6, whereby the Axial Cutting Elements 24 (and Rearward Axial Elements, if employed) are distanced from the disk periphery 22 or 22T. During operation, once the maximum depth has been reached, the Axial Cutting Elements block any further advance of the disk blade. The Radial Mode Cutting Depth Limiting Feature is integral to all versions of the present invention.

Axial Mode, FIGS. 7, 8

This mode of operation is completely unconventional for all ordinary disk designs. It has a primary work direction which is extensive of the rotational axis of the blade and is therefore at 90 degrees to the surface of the blade. Effective functioning in this direction is clearly not possible, nor was such functioning ever intended, for ordinary disk blades. However, adaptation of serrated, axial elements onto the forward disk surface in the manner illustrated by this application, produces several unexpected new results. It infact transfers the superbly smooth and yet aggressive cutting qualities of the venerable disk blade into an unconventional work direction, herein called the Axial Mode.

Axial Mode capability is extremely useful because it makes both cutting and shredding actions possible with great efficiency, in blade work directions not otherwise feasible. The shredding action is particularly pronounced in this mode. A relatively small diameter between rapidly rotating projecting Axial Cutting Elements quickly produces correspondingly small lengths of cut or shredded plant material during operation. Also, the Axial Cutting Elements are very aggressive in their action. Particularly lateral sweeping motions simultaneously coupled with forward thrusting movements result in significant amounts of shredded material due to both the multiplicity and rapidity of successive individual cutting engagements.

The Axial Mode also has an integral Cutting Depth Limiter. This feature is incorporated by tailoring the hight of 34, FIGS. 3a and 6, of the Axial Cutting Elements 24 and 24T. Again this serves to protect the powertrain under certain conditions.

Axial Mode Locating Guide Feature—FIGS. 1, 2, 4, 5, 8

One outstanding characteristic of the present invention was totally unanticipated and merits special attention due to its usefulness. Already introduced under Objects and Advantages, it is termed the Locating Guide Feature. Incidentally discovered during field testing of various embodiments of the invention, this feature is found to be a significant asset during certain applications. As FIGS. 1, 2, 4 and 5 clearly show, the projecting Forward Cutting Elements 24, 24T form an unusual shape on their mounting surfaces 36, 36T. This configuration of semicircular cutting elements, projecting some distance axially, effectively transforms itself into a shallow cylinder at high rotational speeds. The cylinder is fully open only on one side. This opening is then thrust onto various plant objects which, if of sufficient flexibility to somewhat conform to its interior dimensions, will act as a guide. It is thus the accommodation of pliable plant structures to the interior space provided by the rotating Axial Cutting Elements, which assists in positioning the compound blade, resulting in a locating Guide Feature. FIG. 8 shows a simplified illustration of the process. The primary usefulness of this feature rests on the fact that the cutting implement need not be swung incessantly from side to side during certain cutting and shredding actions, but can instead operate in an uninterrupted, more efficient manner.

Diagonal Mode—FIG. 7

It will be apparent, that there are many situations when operational contact of the blade falls neither clearly into the Radial nor into the Axial Mode. Cantact angles with the engaged flora will in fact change often and rapidly from mode to mode due to the random growth patterns encountered in natural vegetation. In this environment, Diagonal Mode cutting and shredding, either forward or to the rear, simultaneous engagement of disk periphery and projecting Axial Forward (or Rearward) Cutting Elements, is very useful. This versatility makes the blade truly multidirectional. FIG. 7 illustrates simultaneous Radial Mode and Axial Mode contacts arrows '66' and '68' respectively.

Rearward Axial Mode—FIG. 3b

Broadly defined as including all cutting and shredding actions at angles emanating from the rear of the blade (i.e. toward the operator), this is not a primary mode of operation. However, some capability in this direction is desirable to provide the compound blade with a cutting feature useful during certain lateral withdrawal movements, which set the stage for further thrusting actions. This is of value particularly in very dense vine entanglements. Without this capability, the repeated withdrawal movements would be largely wasted motion. As already stated under the discriptive section, the Axial Rearward Cutting Elements may be smaller in size relative to their opposite counterparts. Optimal effectiveness is obtained, by angling these elements at about 45 degrees from their mounting surface. FIG. 3b illustrates a mounted compound blade with Rearward Axial Cutting Elements.

Anti—Fouling Feature—FIG. 3b

The incorporation of Rearward Axial Cutting Elements further provides a solution to the problem of very thin plant filaments, shavings, stalks, vines and the like to wrap themselves around the narrow section of exposed drive shaft immediately behind the blade. The problem can be a nuisance, since it requires periodic work stoppage and hand clearing. The present solution is to recess a fixed circular plate into the space provided by the rotating Axial Cutting Elements, in close fitting proximity. This plate is fixed onto the drive shaft housing. FIG. 3b at 60 shows the plate in its relationships to other components. Elements 25 prevent ingress of debris during rotation as they perform circular clearing motions during each revolution.

Self—Cleaning Feature—FIGS. 2, 8

Potential build-up of debris within the circular arrangements of both Forward and Rearward Axial Cutting Elements is prevented through the interaction of centrifugal forces and the wide gapping or open spacing incorporated between each two Axial Elements, ends and beginnings, as shown by FIG. 2 at locations 32. The practical operation is further illustrated by FIG. 8, showing ejection of debris through the open intervals during rapid rotation.

Conclusions, Ramifications and Scope of Invention

Thus the reader will see that the compound blade of the present invention provides a very useful and efficient device, embodying both outstanding multidirectional cutting and in-situ shredding capabilities, while simultaneously lending itself to very economical manufacture due to the inherent simplicity of design and construction.

While numerous specificities are entailed in the above descriptions, these must not be construed as being limitative to the overall scope and spirit of the invention. The description merely exemplifies preferred embodiments of the invention, of which many variations are possible without departure from either the scope or spirit of the invention. Anyone skilled in the art will therefore be able to devise many workable modifications, all of which may have merit, but all of which are nonetheless intended to be included within the scope and spirit of the present invention.

For example, it is possible to reduce the number of elements projecting from either surface of the disk to only one, appropriately counterbalanced.

In another version, several circular arrangements of projecting cutting elements, particularly on the forward facing disk surface, will add to the shredding capability. However, some important considerations must reflect of higher power requirements, added weight, manufacturing complexity and associated costs, as well as maintenance problems.

To accentuate the already present Locating Guide Feature, the arrangement of forward facing projecting cutting elements may be in spiral configuration, but as above, no single design can encompass every advantage optimally, but any successful design represents compromise in some aspect. What has been illustrated represents a workable, tested compromise with good overall qualities.

Other, subtler variations entail mere changes in the set of the teeth of the various cutting elements thereby altering the width of the cut through the appropriate staggering of individual saw teeth from side to side. Obviously, a wide variety of saw tooth designs may also be chosen from. Further, the choice of materials to comprise the entire unit or component parts is equally wide. Tool grade alloy steel such as AISI type 02 with a 0.90 carbon and a 1.60 manganese content, appropriately hardened, is but one example of many suitable variations. The choice is not restricted to steel, as many light applications will benefit from a suitable selection in one of the many elastomers, such as natural or synthetic rubbers, ethelene-propylene copolymer, polyester elastomers and others.

For very light applications, incorporating both safety and economy, an injection moulded elastomer blade of very low cost, easily and cheaply replaced upon excessive wear, will be useful.

Accordingly, the scope and spirit of the invention should be determined not by the embodiments illustrated, but by the appended claims and their legal equivalents.

I claim:

1. A cutting and shredding blade for motorized brush cutters comprising:
   a disk cutting member having peripheral cutting means thereon, whereby radial cutting is accomplished,
   a mounting aperture in the center of said disk for mounting said disk to said brush cutter,
   auxiliary cutting means disposed below said disk and projecting perpendicular thereto and
   said auxiliary cuttings means including ramp shaped triangular structures with a serrated cutting edge leading up each triangular structure, whereby axial cutting is accomplished.

2. The blade of claim 1 wherein said auxiliary cutting means are each longitudinally curved to conform to an imaginary circle, whereby during high speed operation successively deepening cuts are made by the auxiliary cutting means following in the path of previous ones.

3. The blade of claim 1 wherein said auxiliary cutting means are provided with an unserrated margin of material near the top of the incline, whereby the primary cutting contact area is buffered and a reserve of material is made available for reclaiming.

4. The blade of claim 1 wherein said auxiliary cutting means are separated one from the other and wherein substantial open spacing exists between the beginning and ending of any two adjacent said auxiliary cutting means, whereby an effective means of radial cutting and shredding is provided in addition to a self cleaning action based on centrifugal forces.

5. The blade of claim 1 wherein said auxiliary cutting means are made integral with said disk.

6. The blade of claim 1 wherein said auxiliary cutting means are mounted on an auxiliary disk member having an auxiliary mounting aperture in the center thereof for mounting to said brush cutter.

* * * * *